Patented Aug. 25, 1953

2,650,207

UNITED STATES PATENT OFFICE 2,650,207

COMPOSITIONS COMPRISING COPOLYMERS OF VINYLIMIDES AND UNSATURATED ALKYD RESINS AND PROCESS OF MAKING SAME

John B. Rust, Verona, and William B. Canfield, Montclair, N. J., assignors, by direct and mesne assignments, of one-half to Montclair Research Corporation, a corporation of New Jersey, and one-half to Ellis-Foster Company, a corporation of New Jersey No Drawing. Application November 17, 1949, Serial No. 128,011

10 Claims. (Cl. 260—45.4)

This invention relates to the production of new materials having valuable and characteristic properties which make them especially suitable for use in industry, for example, in molding, laminating, coating and adhesive applications, and for other purposes. The invention is concerned more particularly with compositions of matter comprising a polymerizable unsaturated alkyd resin obtained by the reaction of ingredients comprising a dihydric alcohol and an alpha-unsaturated alpha-beta dicarboxylic acid, and a vinylimide having the formula

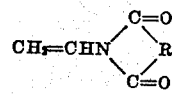

wherein R is an alkylene or arylene group. The invention is also concerned with the interpolymers of the unsaturated alkyd resin and such N-vinylimide, and with the process of making them.

Binders have been disclosed which consist of a polymerizable unsaturated alkyd resin and a liquid polymerizable substituted-ethylene body which is copolymerizable therewith. Such bodies range from low-boiling liquids to high-boiling syrups. Yet each such binder has the disadvantage of partially curing at room temperature during storage. It is true that cellulosic fillers in amounts of about 40% to 60% increase the shelf-life of the molding composition to an appreciable extent but long shelf-life is to be desired.

The N-vinylimides which are used in the present invention are solids which do not polymerize below their melting points, which are in the range of 70°–80° C. Thus, their marked stability at room temperature is advantageous since molding compositions into which they are formulated will have a long shelf-life.

The general procedure for making the compositions herein used is to prepare a substantially linear polyhydric alcohol ester of an unsaturated polycarboxylic acid material of the maleic type and to incorporate this resinous material with the N-vinylimide which is copolymerizable therewith along with a catalyst for subsequent cure. The mixture thus produced, in which the N-vinylimide is present in solid form, is intimately mixed with a filler, preferably of the cellulose type, to form a molding composition. Plasticizers, dyes, or pigments may be included if desired. The composition thus formed possesses storage stability at ordinary temperatures and when heated between about 120° C. and 200° C. under pressure, forms hard, tough, heat-set articles.

Maleic anhydride is the preferred unsaturated acid material which is esterified, but maleic acid, fumaric acid, or itaconic and citraconic acids or anhydrides may be used instead. Other polycarboxylic acids such as malic or citric, which partially decompose on heating, into acids of the maleic type at the preferred esterification temperature of 180°–240°, may be employed also. Part of the unsaturated acid may be replaced by a saturated acid such as phthalic, succinic, adipic, etc.

Dihydric alcohols which react with dicarboxylic acids to form linear molecules or polyesters are the preferred types of polyhydric alcohol. Thus, there may be used diethylene glycol, ethylene glycol, triethylene glycol, trimethylene glycol, propylene glycol, and the like. Also, mixtures of these polyhydric alcohols may be employed.

A linear type of structure is preferable since this permits reaction of the mixture of maleic-type material and polyhydric alcohol sufficiently to produce an ester of high molecular weight and low acid number. In the final cure the linear molecule is converted by the N-vinylimide with which it is mixed to a 3-dimensional type of molecule by cross-linking the linear molecules. Thus, the higher the molecular weight of the polyester, the more maleic points (double bonds) per molecule there are available for cross-linkage. Thus the cure is faster and a lower temperature is required for such cure.

The unsaturated alkyd resin (preferably of acid number 5 to 20) is incorporated as mentioned above with the requisite amount of N-vinylimide miscible therewith and intended to cause cross-linkage of the polyester molecules. Such N-vinylimide as are intended for use as cross-linking agents are represented by the general formula previously noted. Such compounds are all N-vinylimides of dicarboxylic acids whose carboxyl groups are on adjacent carbon atoms, the acids having the formula HOOC—R—COOH, where R is a divalent radical. This radical is an alkylene (e. g., a 1,2-alkylene such as ethylene or 1,2-propylene) or arylene (e. g., phenylene) group and may be halogen- or alkyl-substituted but is free from all substituent groups which interfere with polymerization. Examples of such vinylimides are N-vinyl succinimide, N-vinyl methylsuccinimide, N-vinyl phthalimide, N-vinyl chlorophthalimide, N-vinyl naphthalenedicarboximide and N-vinylimides of the hydrophthalic acids obtained by reaction of alpha-unsaturated alpha-beta dicarboxylic acids with conjugated diolefins such as butadiene, isoprene, chloroprene, cyclopentadiene, etc.

The proportion of N-vinylimide to be used with the unsaturated alkyd resin may be in the range of 1–50% N-vinylimide and 50–99% maleic resin. A range of from 10 to 40% N-vinylimide resin is generally to be preferred.

The maleic resin–N-vinylimide compositions may be cured without added catalyst, but such cure is somewhat slow. Hence, a curing catalyst such as benzoyl peroxide, t-butyl hydroperoxide, acetyl peroxide, acetyl benzoyl peroxide or the like may be used. The peroxide catalyst in amounts of 0.1 to 1% based on the binder is usually sufficient.

There are numerous fillers which may be used in preparing the molding compositions of the present invention. Alpha cellulose flock has been generally employed throughout the examples. Other forms of fillers include woodflour, shredded paper, cloth, asbestos, chopped canvas, chalk and the like.

Mixing the filler with the resinous binder may be done in any suitable manner. Kneading under pressure at 20°–25° C. in a Banbury mixer is most effective. Where pigments are employed, such are added during the mixing operation.

The molding compositions, being soft and slightly moist, can be pelleted or otherwise preformed if desired, and are preferably molded at 120°–200° C. for 0.5–3 minutes and usually at pressures of 1000–4000 pounds per square inch.

These compositions possess a very fast rate of cure and thus may be employed for molding articles where high speed of production is desirable such as in the manufacture of buttons, bottle caps, and the like. Many other uses will be apparent such as in the production of dishes, electrical insulations, smoker's articles, dentures, lenses and so forth.

As noted above it is also within the range of the present vinylimide compositions to be useful in the preparation of plywood moldings and other laminates. Such articles consist of alternate layers of wood, cellulose fiber, canvas, cardboard, glass fiber and the like, which are united with layers of binder and hot-pressed to secure a uniform product.

The following examples illustrate the products of the present invention. All parts are by weight.

Example 1

Maleic anhydride (588 parts) and diethylene glycol (700 parts) were heated in a suitable reactor into which nitrogen was bubbled for 7½ hours at 200°–220° C. Heating was by means of a hot oil bath. The product was a light-colored syrup having an acid number of 16.7. 40 parts of the above product, 10 parts of N-vinylphthalimide, and 1 part of benzoyl peroxide were thoroughly mixed with 50 parts of alpha cellulose flock in a cooled Banbury mixer. The composition was a soft, crumbly, damp powder which could be easily formed into pellets by pressure.

When molded at 3000 pounds per square inch and 150° C. for 1 minute, a well-formed, hard, tough disk molding was formed which was characterized by a good glaze. The molding possessed a Rockwell hardness of 78. A molded disk was immersed in boiling water for 15 minutes, during which time the glaze was unimpaired and the material did not weaken. The water absorption was only 1.0%.

Example 2

Forty parts of the diethylene glycol maleate polyester of Example 1, 20 parts of N-vinylphthalimide, and 1.0 part of benzoyl peroxide were admixed in a non-heated Banbury mixer with 60 parts of alpha cellulose flock. The resulting molding composition was soft and crumbly, but slightly damp, and was molded at 150° C. and 2000 pounds per square inch pressure for 15 sec., 30 sec., 1 min., 3 min., and 5 min. All moldings in the form of 10-gram disks approximately $\frac{1}{16}$″ in thickness were hard and possessed an excellent gloss.

Example 3

Fifty parts of the diethylene glycol maleate polyester of Example 1 and 25 parts of N-vinylphthalimide were mixed with 150 parts of asbestos floats and 2 parts of benzoyl peroxide in a Banbury mixer at 25° C. The product was molded for 2 min. at 150° C. and 3000 pounds per square inch pressure. The resulting disks were dull gray in color and possessed a very high gloss.

Example 4

Fifty parts of diethylene glycol maleate polyester and 25 parts of N-vinylphthalimide were dissolved in 50 parts of ethyl acetate containing 0.75 part of benzoyl peroxide. Six pieces of wood 4″ x 4″ x $\frac{1}{32}$″ were coated on alternate sides with 3 coats of the ethyl acetate solution. The coated wood was air-dried and then pressed together for 2 minutes at 3000 pounds per square inch gauge-pressure and 150° C. The molded plywood was very strong and well bonded.

Example 5

One hundred parts of diethylene glycol maleate and 50 parts of N-vinylsuccinimide were dissolved in 75 parts of ethyl acetate containing 1.50 parts of benzoyl peroxide. Three pieces of cardboard were steeped in the solution and allowed to air-dry to remove the solvent. The impregnated cardboard was then hot-pressed for 3 minutes at 177° C. and 2000 pounds per square inch pressure. The resulting molding possessed an excellent degree of gloss.

Example 6

Forty parts of a diethylene glycol maleate polyester was admixed with 10 parts of N-vinyl hydrophthalimide, 1 part of benzoyl peroxide, and 50 parts of alpha cellulose flock in a Banbury mixer at 25° C. The resulting molding composition was granular and somewhat damp. Hard disks were prepared by molding for ½ minute and 1 minute at 150° C. and 2000 pounds per square inch pressure.

Example 7

Diethylene glycol (424 parts) and fumaric acid (464 parts) were heated at 200°–215° C. for 3½ hours in an atmosphere of nitrogen. The product had an acid number of 18.2.

A mixture was made consisting of 250 parts of the above ester and 50 parts of N-vinylsuccinimide and 3.0 parts of benzoyl peroxide.

To 75 parts of this mixture in the Banbury mixer was added and ground (a) 75 parts of alpha cellulose flock
(b) 75 parts of chalk
(c) 75 parts of asbestos All three molding compositions were then molded at 150° C. and 2500 pounds per square inch pressure for 1 minute. The products had the following appearance.

(a) Hard, light, high gloss
(b) Hard, white, glossy
(c) Dark, hard, fair gloss

The above examples have been given to explain the mechanics of the present invention and should not be considered as limiting.

The cured articles illustrated above are insoluble and substantially unaffected by either hot or cold water. The molding compositions of the present invention are fast curing, and the cured binder consists mainly of an ester of a maleic type polycarboxylic acid and a polyhydric alcohol, and an N-vinylimide prepared from a dicarboxylic acid. It is, however, limited to those binders containing a minor proportion of an N-vinylimide which, under the influence of heat and pressure, serves as a cross-linking agent for the polycarboxylic acid-polyhydric alcohol polyester.

The following example shows the effect of using an unsaturated alkyd resin as the sole constituent of the binder in contrast to the binders shown in Examples 1–7.

Example 8

Eighty parts of the diethylene glycol maleic ester of Example 1 and 1.2 parts of benzoyl peroxide were mixed together to form a clear syrup. Eighty parts of alpha cellulose flock were added and the constituents were thoroughly mixed in a cooled Banbury mixer. The composition was a soft, crumbly damp powder which could be easily formed into pellets by pressure.

When molded at 3000 pounds per square inch and 150° C. for 1 minute (the same conditions as were suitable for the other examples) well-formed, relatively soft, non-glossy disks were obtained. These disks could be easily marked with the finger-nail, disintegrated in boiling water, and were apparently insufficiently cured.

We claim:

1. A hardenable composition, having storage stability and curing rapidly at temperatures from 120° to 200° C., comprising, as sole reactive components, a polymerizable unsaturated alkyd resin obtained by reaction of ingredients comprising a dihydric alcohol and an alpha unsaturated alpha beta dicarboxylic acid, a solid N-vinylimide of the formula

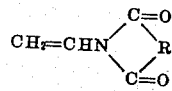

wherein R is a divalent radical selected from the group consisting of alkylene and arylene radicals, and a catalyst for accelerating the hardening reaction of said mixed components when heated, the proportion of said vinylimide being from 1% to 50% of the mixture of vinylimide and unsaturated alkyd resin and said vinylimide being present as a solid.

2. A hardenable composition, having storage stability and curing rapidly at temperatures from 120° to 200° C., comprising, as sole reactive components, a polymerizable unsaturated alkyd resin obtained by reaction of ingredients comprising diethylene glycol and an alpha unsaturated alpha beta dicarboxylic acid, a solid N-vinylimide of the formula

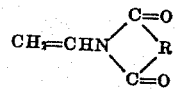

wherein R is a divalent radical selected from the group consisting of alkylene and arylene radicals, and a catalyst for accelerating the hardening reaction of said mixed components when heated, the proportion of said vinylimide being from 1% to 50% of the mixture of vinylimide and unsaturated alkyd resin and said vinylimide being present as a solid.

3. A hardenable composition, having storage stability and curing rapidly at temperatures from 120° to 200° C., comprising, as sole reactive components, diethylene glycol maleate, a solid N-vinylimide of the formula

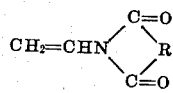

wherein R is a divalent radical selected from the group consisting of alkylene and arylene radicals, and a catalyst for accelerating the hardening reaction of said mixed components when heated, the proportion of said vinylimide being from 1% to 50% of the mixture of vinylimide and unsaturated alkyd resin and said vinylimide being present as a solid.

4. A hardenable composition, having storage stability and curing rapidly at temperatures from 120° to 200° C., comprising, as sole reactive components, a polymerizable unsaturated alkyd resin obtained by reaction of ingredients comprising a dihydric alcohol and an alpha unsaturated alpha beta dicarboxylic acid, N-vinylphthalimide, and a catalyst for accelerating the hardening reaction of said mixed components when heated, the proportion of said vinylimide being from 1% to 50% of the mixture of vinylimide and unsaturated alkyd resin and said vinylimide being present as a solid.

5. A hardenable composition, having storage stability and curing rapidly at temperatures from 120° to 200° C., comprising, as sole reactive components, a polymerizable unsaturated alkyd resin obtained by reaction of ingredients comprising a dihydric alcohol and an alpha unsaturated alpha beta dicarboxylic acid, N-vinylsuccinimide, and a catalyst for accelerating the hardening reaction of said mixed components when heated, the proportion of said vinylimide being from 1% to 50% of the mixture of vinylimide and unsaturated alkyd resin and said vinylimide being present as a solid.

6. A composition comprising the hardened product obtained by heating the composition of claim 1.

7. A composition comprising the hardened product obtained by heating the composition of claim 2.

8. A composition comprising the hardened product obtained by heating the composition of claim 3.

9. A composition comprising the hardened product obtained by heating the composition of claim 4.

10. A composition comprising the hardened product obtained by heating the composition of claim 5.

JOHN B. RUST.
WILLIAM B. CANFIELD.

References Cited in the file of this patent
UNITED STATES PATENTS

| Number | Name | Date |
|---|---|---|
| 2,231,905 | Hanford et al. | Feb. 18, 1941 |
| 2,407,479 | D'Alelio | Sept. 10, 1946 |
| 2,462,354 | Brubaker | Feb. 22, 1949 |